US010181017B2

(12) United States Patent
Clarke et al.

(10) Patent No.: US 10,181,017 B2
(45) Date of Patent: Jan. 15, 2019

(54) SWIPE MECHANISM

(71) Applicant: Lenovo (Singapore) Pte. Ltd., Singapore (SG)

(72) Inventors: Fergal Clarke, San Jose, CA (US); Carlos Munoz-Bustamante, Durham, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 241 days.

(21) Appl. No.: 14/964,225

(22) Filed: Dec. 9, 2015

(65) Prior Publication Data

US 2017/0169199 A1 Jun. 15, 2017

(51) Int. Cl.
*G06F 3/041* (2006.01)
*G06F 21/31* (2013.01)
*G06F 3/0488* (2013.01)
*G06F 3/01* (2006.01)
*G06F 3/038* (2013.01)
*G06F 21/36* (2013.01)
*G06F 3/0346* (2013.01)

(52) U.S. Cl.
CPC .............. *G06F 21/31* (2013.01); *G06F 3/017* (2013.01); *G06F 3/038* (2013.01); *G06F 3/0346* (2013.01); *G06F 3/041* (2013.01); *G06F 3/0488* (2013.01); *G06F 3/04883* (2013.01); *G06F 21/36* (2013.01); *G06F 2203/0381* (2013.01)

(58) Field of Classification Search
CPC ......... G06F 3/0488; G06F 3/041; G06F 3/017
See application file for complete search history.

(56) References Cited

U.S. PATENT DOCUMENTS

| 8,586,492 | B2 | 11/2013 | Barefoot et al. | |
|---|---|---|---|---|
| 2001/0047488 | A1* | 11/2001 | Verplaetse | G06F 21/32 726/5 |
| 2002/0137524 | A1* | 9/2002 | Bade | H04W 12/08 455/456.2 |
| 2004/0111646 | A1* | 6/2004 | Little | G06F 21/36 726/19 |
| 2005/0193144 | A1* | 9/2005 | Hassan | G06F 21/31 709/238 |
| 2005/0268107 | A1* | 12/2005 | Harris | G06F 21/31 713/182 |

(Continued)

OTHER PUBLICATIONS

Xia et al., "Innovations in fingerprint capture devices", Pattern Recognition 36 (2003) 361-369 (9 pages).

(Continued)

*Primary Examiner* — Dorothy Harris
(74) *Attorney, Agent, or Firm* — Brian J. Pangrle

(57) ABSTRACT

A device can include a processor; memory operatively coupled to the processor; a touchscreen display operatively coupled to the processor; a sensor operatively coupled to the processor; and instructions stored in the memory and executable by the processor to render targets to the touchscreen display, receive, via the touchscreen display, pattern information associated with the targets, receive sensor information via the sensor, and transition the device from a locked state to an unlocked state based at least in part on stored pattern information, the received pattern information and the received sensor information.

23 Claims, 13 Drawing Sheets

(56) References Cited

U.S. PATENT DOCUMENTS

| | | | | |
|---|---|---|---|---|
| 2007/0015490 | A1* | 1/2007 | Munje | H04M 1/66 |
| | | | | 455/410 |
| 2011/0102455 | A1* | 5/2011 | Temple | G06F 3/017 |
| | | | | 345/619 |
| 2011/0260829 | A1* | 10/2011 | Lee | G06F 3/0414 |
| | | | | 340/5.51 |
| 2012/0252410 | A1* | 10/2012 | Williams | G06F 21/36 |
| | | | | 455/411 |
| 2013/0234971 | A1* | 9/2013 | Li | G06F 3/04883 |
| | | | | 345/173 |
| 2014/0325222 | A1* | 10/2014 | Kim | H04L 63/0428 |
| | | | | 713/168 |
| 2015/0309657 | A1* | 10/2015 | Park | G06F 3/0412 |
| | | | | 345/173 |
| 2016/0062591 | A1* | 3/2016 | Hwang | G06F 1/1694 |
| | | | | 345/173 |
| 2016/0156473 | A1* | 6/2016 | Hewitt | H04L 9/3234 |
| | | | | 726/20 |
| 2016/0359863 | A1* | 12/2016 | Krstic | H04L 63/102 |

OTHER PUBLICATIONS

Crown, The Development of Latent Fingerprints with Ninhydrin, 60 J. Crim. L. Criminology & Police Sci. 258 (1969) (8 pages).
Corning, Gorilla Glass Brochure, 2015 (2 pages).
Tahiri, Android Forensics: Cracking the Pattern Lock Protection, Forensics, Aug. 19, 2013 (15 pages).

* cited by examiner

SWIPE MECHANISM

TECHNICAL FIELD

Subject matter disclosed herein generally relates to technology for touchscreen display devices.

BACKGROUND

Various types of devices, systems, etc. include at least one touchscreen display.

SUMMARY

A device can include a processor; memory operatively coupled to the processor; a touchscreen display operatively coupled to the processor; a sensor operatively coupled to the processor; and instructions stored in the memory and executable by the processor to render targets to the touchscreen display, receive, via the touchscreen display, pattern information associated with the targets, receive sensor information via the sensor, and transition the device from a locked state to an unlocked state based at least in part on stored pattern information, the received pattern information and the received sensor information. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a swipe pattern on a display surface of a device such as, for example, a smartphone or a tablet, can be input that is analyzed to transition the device from one state to another state such as, for example, from a locked state to an unlocked state. However, where an object such as a finger, a stylus, etc., contacts a display surface of a device, evidence of such contact may remain. In such an example, by closely inspecting the display surface, the evidence may reveal at least a portion of a swipe pattern that was used to unlock the device. Where a swipe pattern can be discerned via evidence from prior contact, the swipe pattern, as a lock mechanism, is compromised.

Figure 1:
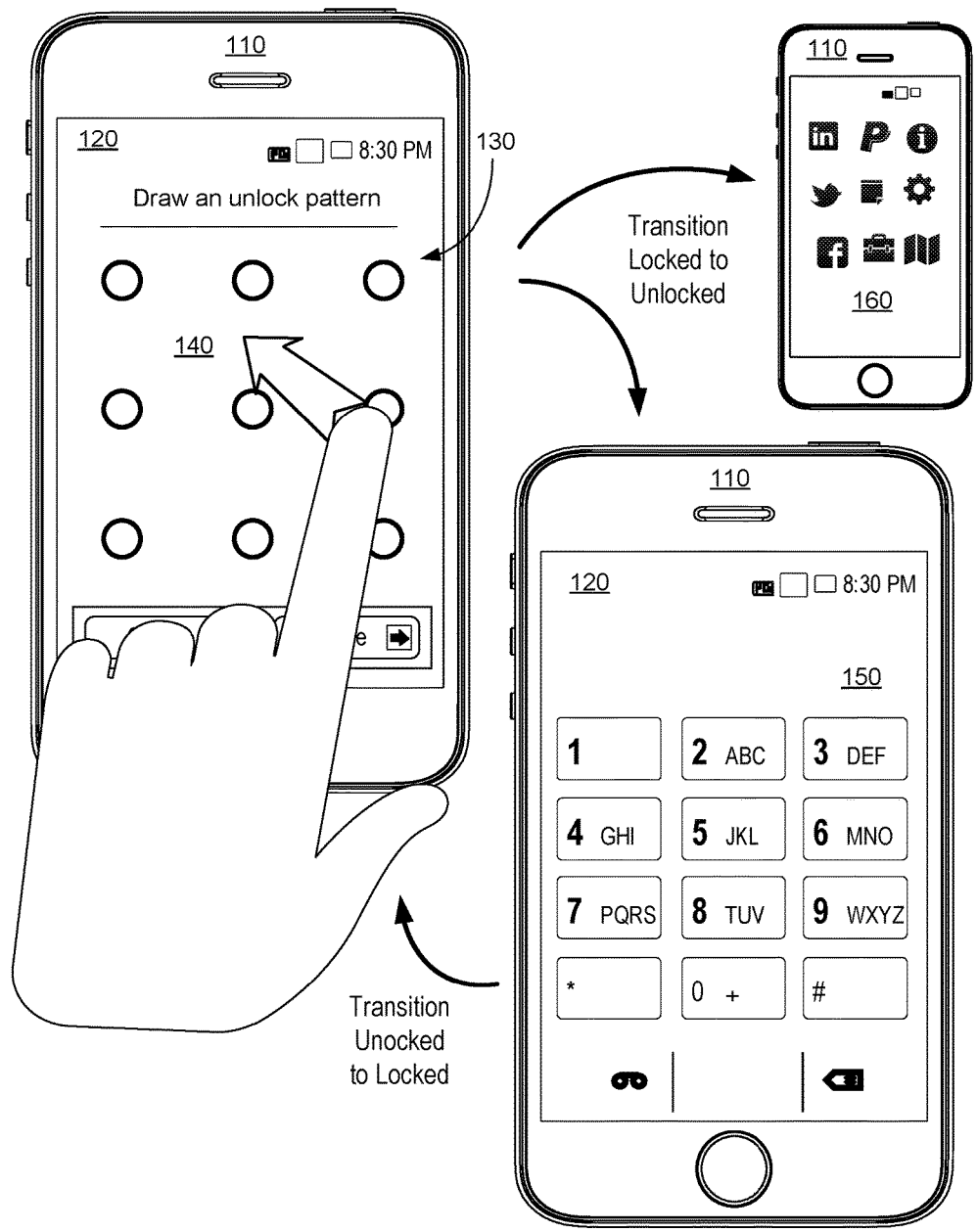
FIG. 1 is a diagram of an example of a mobile device.

FIG. 1 shows an example of a device 110 that includes a touchscreen display 120 with a corresponding display surface 130 where the device 110 can render information to the touchscreen display 120. As shown, the device 110 can render dots 140 (e.g., targets) to the touchscreen display 120 or, for example, keys 150 associated with a phone application or, for example, icons 160 associated with various applications. As an example, one or more of the icons 160 may be selected to instantiate, switch to, etc., an application that executes at least in part on the device 110.

In the example of FIG. 1, the touchscreen display 120 can receive touch information associated with an object (e.g., a finger, a stylus, etc.) that moves in a pattern with respect to the dots 140 (e.g., targets). Such a pattern may be referred to as a swipe pattern, which is a "secret" code stored in memory of the device 110 and known, for example, to a user of the device (e.g., an owner of the device, an account holder for communication circuitry of the device, etc.). As an example, the device 110 can compare a swipe pattern received via the touchscreen display 120 (e.g., as a code) to information stored in memory (e.g., a code, etc.) to determine whether a match exists. And, in such an example, where a match exists, the device 110 may transition from a locked state to an unlocked state. As an example, after a period of time (e.g., where input is not received via the touchscreen display 120, etc.), the device 110 may transition from the unlocked state to the locked state. As an example, the device 110 may include a switch (e.g., a button, etc.) that can cause such a transition.

As to an unlocked state, FIG. 1 shows an example of an unlocked state with the keys 150 and another example of an unlocked state with the icons 160. In these examples, one or more applications are available for execution on the device 110 and, for example, for interactions via one or more graphical user interfaces (GUI) rendered to the touch screen display 120. As an example, in a locked state, the device 110 may render the dots 140 to the touchscreen display 120 and may include a graphical control that can be actuated to access a key for making an emergency call (e.g., dialing 911).

As shown in FIG. 1, the dots 140 (e.g., targets) are arranged in a 3×3 matrix (e.g., a total of nine dots). The 3×3 matrix may be considered to be a matrix of points that can be represented by numbers such as, for example, 0 to 8 (e.g., where the top left corner is 0 and the bottom right corner is 8). As an example, a user may swipe a sequence as to targets such as 5 to 1 to 0 to 4 to 6 for a sequence 51046.

As an example, the device 110 of FIG. 1 can include an operating system (OS) such as, for example, an iOS OS (Apple, Cupertino, Calif.), ANDROID OS (Google, Mountain View, Calif.), WINDOWS OS (Microsoft Corporation, Redmond, Wash.), FIRE OS (Amazon, Seattle, Wash.), etc.

As an example, consider the device 110 of FIG. 1 as including an ANDROID OS that can be instructed to store pattern lock data in an unsalted SHA-1 encrypted bytes sequence format. As an example, consider the following pseudo code

```
private static byte[] patternToHash(List pattern) {
    if (pattern == null) {
        return null;
    }
    final int patternSize = pattern.size( );
```

-continued

```
    byte[] res = new byte[patternSize];
    for (int i = 0; i < patternSize; i++) {
        LockPatternView.Cell cell = pattern.get(i);
        res[i] = (byte) (cell.getRow( ) * 3 + cell.getColumn( ));
    }
    try{
        MessageDigest md = MessageDigest.getInstance("SHA-1");
        byte[] hash = md.digest(res);
        return hash;
    } catch (NoSuchAlgorithmException nsa) {
        return res;
    }
}
```

In the foregoing example, rather than storing a numeric sequence directly (e.g., "012587"), the device may store an encrypted byte array in a system file called gesture.key located in the/data/system folder. Given a finite number of possible pattern combinations and the lack of a salted hash, to "break" the code, a process may generate a dictionary containing possible hashes of sequences from 0123 to 876543210 (e.g., about 895824 pattern scheme possibilities).

As an example, where at least a portion of a pattern can be discerned via touch evidence, the number of possibilities may be diminished. The number of possibilities may be diminished to an extent that a person could try such a number in a relatively short period of time without resorting to a computer, etc. For example, for a swipe pattern 0123, where touch evidence is clear as to 012, a person may try 0123 as a logical possibility and thereby "break" the code.

Various types of touch evidence exist and a surface of a particular touchscreen display may exhibit one or more types of touch evidence. As an example, touch evidence may be from a finger of a person. For example, a finger may exude perspiration from pores along papillary ridges where the perspiration includes oils, fats, salts, protinaceous residues, and water. As an example, water may be approximately 98% of a mixture. Fats and oils can be volatile and may be constituents in perspiration that can dissipate after they have been deposited on a surface. For example, various fats and oils may not be ordinarily detectable after approximately 72 hours.

As an example, one or more techniques may be applied to uncover touch evidence. For example, an iodine technique can illuminate oleogenous residues. The iodine technique is physical in nature, rather than chemical, and provides brownish prints of a transitory nature. In such an example, a technique may include fixation and/or photography of the developed prints.

As an example, salts in perspiration may be detectable on a surface associated with a touchscreen display. For example, salts may leave latent fingerprints that can last for several months. A technique to uncover such latent fingerprints may include use of a chemical such as silver nitrate that can react with salt.

Another technique may aim to uncover protinaceous residues as constituents of finger perspiration. Such protinaceous residues, usually in the form of alpha amino acids, can persist for long periods of time and can be detected at long intervals, up to several years later, after their initial deposition. As an example, a chemical such as ninhydrin may be used to uncover protinaceous residues.

As an example, the device 110 can include glass such as, for example, alkali aluminosilicate glass, alkali aluminoborosilicate glass, etc. While such glass is scratch resistant, it can scratch. For example, GORILLA Glass 4, a glass marketed by Corning Incorporated (Corning, N.Y.), is stated to have "high resistance to scratch".

As an example, a finger may carry material, which may include salt or other particulate matter such as, for example, sand. Pure sodium chloride crystals have a Mohs hardness of about 2.5 while GORILLA Glass can have a Mohs hardness of about 6.8, which is less than quartz, which has a Mohs hardness of about 7. Sapphire has a Mohs hardness of about 9. The Mohs scale may be utilized to estimate one substance's ability to scratch another (e.g., an indicator of scratch resistance).

As to sodium chloride crystals, while these may be insufficient to scratch a glass with a Mohs hardness of about 6, they may deposit on glass as a residue. As an example, such residue may deposit on a "flat" surface and/or in depressions of scratches. In either instance, such salt may be touch evidence.

As to particulate matter, sand is a naturally occurring granular material composed of finely divided rock and mineral particles that is defined by size, being finer than gravel and coarser than silt. The composition of sand varies, depending on the local rock sources and conditions, but the most common constituent of sand in inland continental settings and non-tropical coastal settings is silica (silicon dioxide, or $SiO_2$), usually in the form of quartz. The second most common type of sand is calcium carbonate, for example aragonite (Mohs hardness of about 3.5 to about 4). Silt is granular material of a size somewhere between sand and clay whose mineral origin is quartz and feldspar (Mohs hardness of about 6 to about 6.5). Clay is a fine-grained natural rock or soil material that combines one or more clay minerals with traces of metal oxides and organic matter.

An individual may be exposed to one or more materials such as one or more of sand, silt and clay. One or more of such materials may include particles of a hardness that is greater than that of a surface associated with a touchscreen display and may be carried by a finger or otherwise contact a surface associated with a touchscreen display such that motion of the material against the surface causes the surface to scratch. For example, particles of quartz being harder than a glass surface may cause the glass surface to scratch.

As an example, one or more forms of touch evidence may exist that can be examined (e.g., visually, chemically, etc.), to determine at least a portion of a swipe pattern. Preventive measures to avoid touch evidence may be cumbersome and, hence, touch evidence is likely to exist for various devices that implement swipe patterns as part of a security mechanism.

As an example, a security mechanism can implement a swipe pattern in combination with one or more other features. For example, a swipe pattern may be utilized in combination with orientation information. In such an example, the orientation information may be local and/or global. Orientation information can allow for input via a surface of a touchscreen display to differ such that, for example, touch evidence does not "lineup" time after time or otherwise accumulate in a manner that would help to reveal a swipe pattern.

As an example, an algorithm can utilize a swipe pattern for unlocking a device (e.g., a smartphone, a tablet, etc.) where the algorithm also considers accelerometer and/or other orientation-sensor data. Such an approach can allow for various schemes that can benefit from orientation data.

Figure 2:
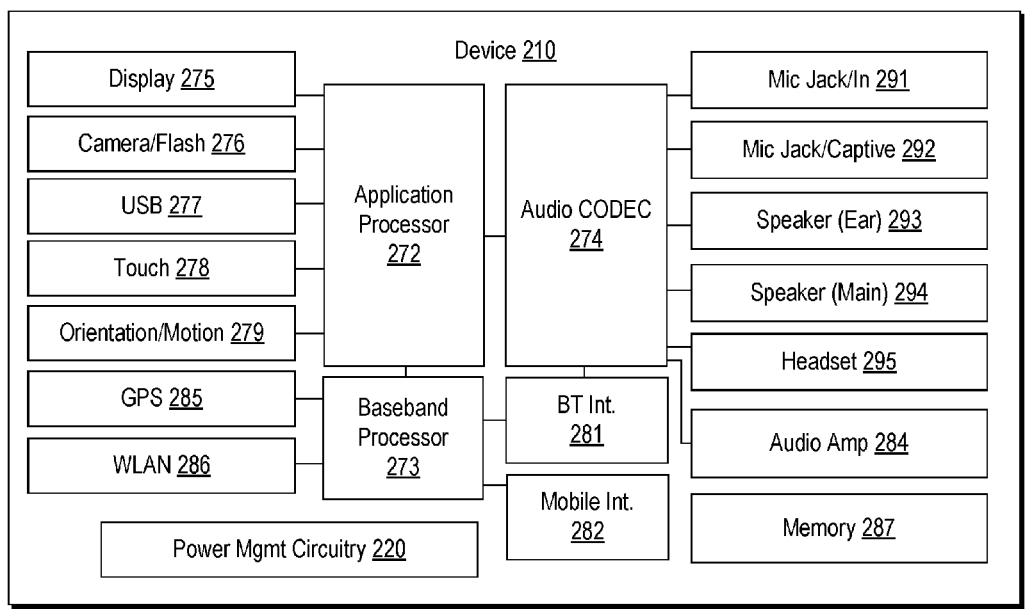
FIG. 2 is a diagram of an example of a mobile device.

FIG. 2 shows a block diagram of an example of a device 210. As an example, the device 110 of FIG. 1 may include one or more features of the device 210 of FIG. 2.

In FIG. 2, the device 210 includes an application processor 272, a baseband processor 273, an audio codec 274, a display 275 (e.g., including display driver circuitry), a camera/flash sub-system 276, a USB port 277, touch sensing circuitry 278, orientation/motion sensing circuitry 279, BLUETOOTH® circuitry 281, mobile circuitry 282, the power management circuitry 220, audio amplification circuitry 284, GPS circuitry 285, WLAN circuitry 286, memory 287, a microphone jack in 291, a captive microphone 292, a captive speaker 293, one or more additional speakers 294, and headset out/circuitry 295. Various types of interfaces may exist between circuitry of a device such as the device 210. As an example, consider an $I^2S$ interface, which may, for example, operatively couple the application processor 272 and the audio codec 274; the baseband processor 273 and the audio codec 274; and the BLUETOOTH® circuitry 281 and the audio codec 274.

As another example, consider a core orientation/motion framework that can provide an application access to orientation and/or motion data from sensing circuitry. Such a framework may support access of raw and/or processed accelerometer data, for example, using block-based interfaces. As an example, consider a device with a gyroscope where a framework provides for retrieval of raw gyro data, processed data, etc. A framework may allow for accelerometer and/or gyro-based data one or more applications that can utilize orientation and/or motion as input. As a particular example, consider an instance of a CMAccelerometerData class that represents an accelerometer event, which may be a measurement of acceleration along multiple spatial axes at a moment of time (e.g., typedef struct {double x; double y; double z;} CMAcceleration). Various examples of resources for the iOS may be available, for example, via Apple Inc., Cupertino, Calif. (see, e.g., developer.apple.com/library/ios/).

As an example, the device 110 or the device 210 can include a processor, memory and orientation and/or motion sensing circuitry. As an example, the orientation and/or motion sensing circuitry may include multi-axis sensing circuitry such as one or more of a gyroscope and an accelerometer (e.g., consider a STMicroelectronics L3G4200D unit, a Bosch BMA220 unit, etc.). As an example, the sensing circuitry may include a tri-axial, low-g acceleration sensor with digital interfaces and/or a three-axis gyroscope.

Figure 3:
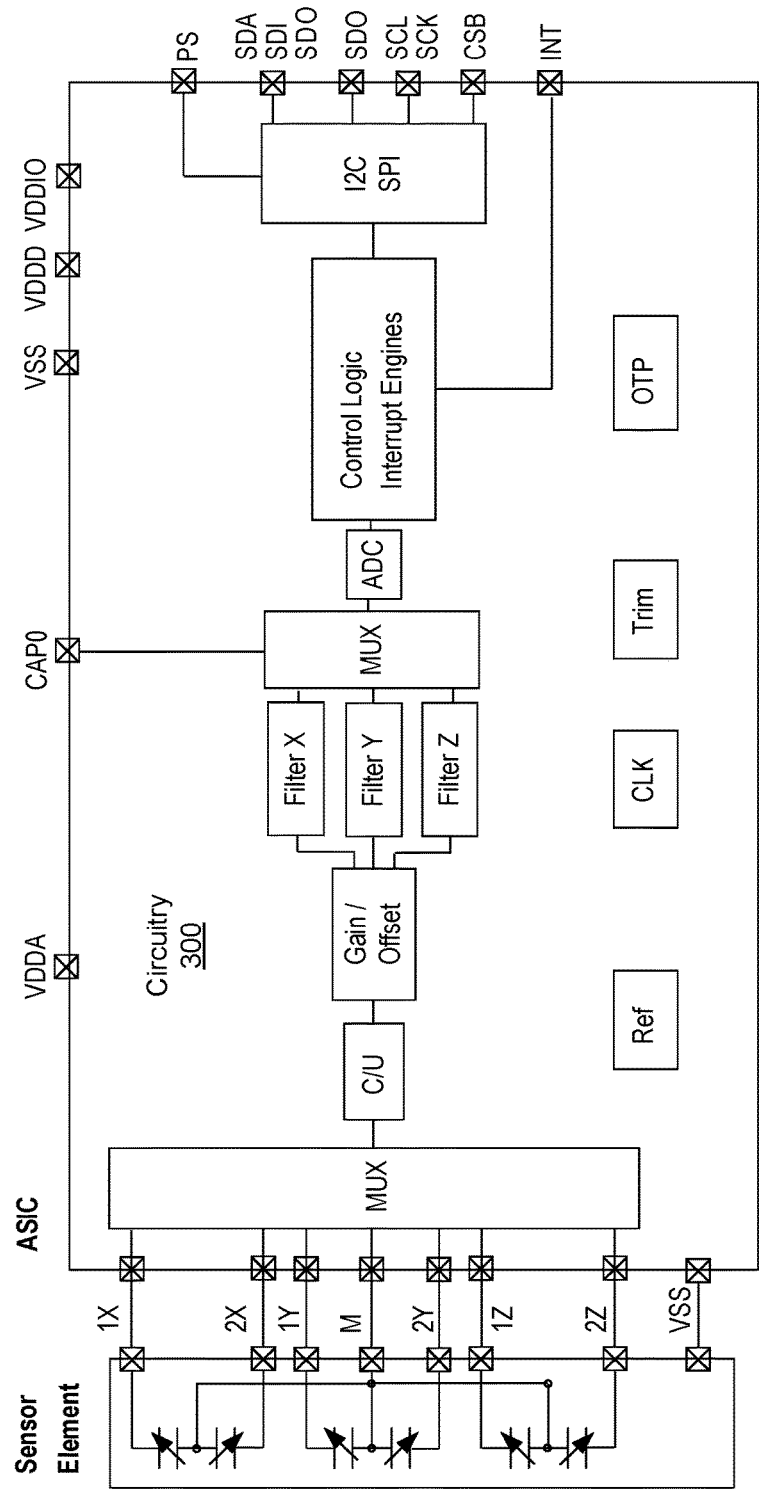
FIG. 3 is a diagram of an example of sensor circuitry.

FIG. 3 shows an example of circuitry 300 that includes sensing circuitry. In particular, a sensor element is shown that includes x, y and z sensing circuits, which may be accelerometer circuits. As an example, the x, y and z sensing circuits may correspond to x, y and z coordinates. As an example, a coordinate system may define yaw, roll and pitch. As an example, yaw may be defined to be planar motion (e.g., rotation) and roll and pitch may be defined to be motion that tilts a plane (e.g., a geometrical plane), which may be a plane defined at least in part by an electronic device.

As shown in the example of FIG. 3, the circuitry 300 may include an $I^2C$ interface and/or an SPI interface (e.g., which may operate via receipt and/or transmission of information via one or more busses). As an example, the circuitry 300 may include signal processing circuitry such as one or more amplifiers, multiplexers, filters, analog-to-digital converters (ADCs), control logic, interrupt engines, etc. As an example, sensing circuitry may include an ASIC that is operatively coupled to one or more sensor elements. In such an example, signals generated by a sensor element may be processed and, for example, transmitted as information via one or more interfaces, one or more busses, etc. As an example, a processor that can execute an application in an operating system environment may receive such information, process at least a portion of the information and transmit information to security circuitry, which may also receive information input via a touchscreen display.

As an example, a device can include digital signal processing (DSP) circuitry that can process information from such as at least a portion of the circuitry 300 of FIG. 3. As an example, DSP circuitry may provide for features such as a configurable buffer (e.g., FIFO, circular, etc.), free-fall and motion detection, transient detection (e.g., fast motion, jolt), enhanced orientation with hysteresis and optionally z-lockout, shake detection, tap and multi-tap detection, etc.

During ordinary usage of a device, the undesirable orientation of information rendered to a display (e.g., a touchscreen display) may be controlled via a z-lockout approach. An undesirable orientation can be an unwanted screen orientation that changes because the magnitudes of gravity (G) projected onto an x-axis or a y-axis can be large relative to each other (triggering the orientation) while at the same time being small relative to G projected onto an z-axis (e.g., noting that the axes names can depend on how a sensor may be oriented fixedly with respect to a device).

As to z-lockout, one or more of a variety of techniques may be implemented to lockout undesirable transitions between, for example, portrait and landscape formats (e.g., as to two possible portrait formats and two possible landscape formats for a device with a rectangular display). For example, in a static approach, an angle may be set (e.g., static) to an angle ranging between about 25 degrees and about 50 degrees. As an example, a dynamic approach may alter "z-lockout" via one or more orientation thresholds, etc., and optionally gather information that may help to understand a user's intent such that operation is not necessarily limited to a static z-lockout angle that is referenced solely to alignment directly with or directly against Earth's gravity (e.g., or an equivalent reference system with an angle defined with respect to the horizon being a plane and Earth's gravity being normal to that plane, which may be a "sine" reference as opposed to a "cosine" reference).

As an example, a method can include implementing a lockout of another type (e.g., other than z-lockout). For example, a device can include circuitry that implements a lockout when targets are rendered to a touchscreen display. In such an example, the targets can be part of a graphical user interface rendered to the touchscreen display where the orientation of the device or a change in orientation of the device does not alter the orientation of the targets or the targets and the graphical user interface. Such a lockout may be disabled upon transition of the device from a locked state to an unlocked state, for example, upon successful processing of secret information (e.g., a swipe pattern and optionally sensor information that may pertain to orientation of the device). Such a lockout may be enabled upon receipt of a trigger to render the targets to the touchscreen display of the device such that the device is ready to receive at least a secret swipe pattern to transition the device from the locked state to an unlocked state where, for example, a desktop may be rendered to the touchscreen display (see, e.g., the desktop that includes the icons 160 of FIG. 1).

As an example, a device can include one or more sensors that can provide information germane to orientation of the device. For example, consider one or more of a geomagnetic field sensor (e.g., magnetometer), a gyroscope and an accelerometer. As an example, information from one or more sensors may be utilized for determining a device's physical position in a frame of reference. For example, a geomagnetic field sensor in combination with an accelerometer can be used to determine a device's position relative to magnetic North. As an example, one or more sensors may allow for determining a device's position in an application's frame of reference. As an example, a sensor may be a position sensor and/or a motion sensor.

Figure 4:
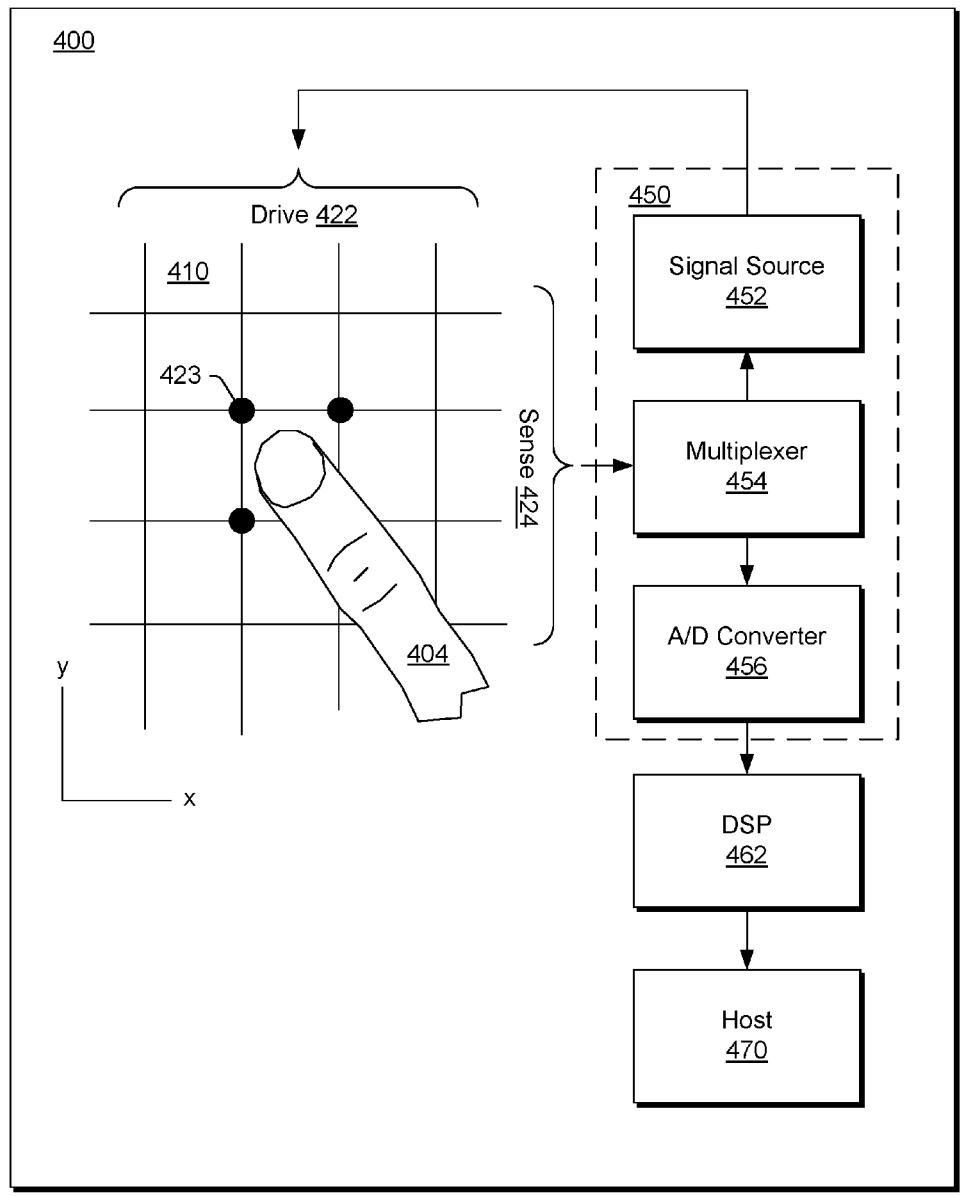
FIG. 4 is a diagram of an example of touch circuitry.

FIG. 4 shows an example of a system 400 that includes a touchscreen 410, touch controller circuitry 450 as well as a digital signal processor 462 and a host 470, for example, a host computing device that may respond to input via the touchscreen 410, which may be a touchscreen of a touchscreen display (see, e.g., the touchscreen display 120 of the device 110 of FIG. 1).

In the example of FIG. 4, the touchscreen 410 is configured using projected capacitive touch technology, for example, where a conductive layer may be etched to form an x-y grid that can be driven by, for example, drive lines 422 running along the y direction and where sensing may occur along sense lines 424 running along the x direction.

In the example of FIG. 4, the touchscreen 410 includes mutual capacitive sensors (e.g., a capacitor at each intersection of each row and each column). As mentioned, charge (e.g., voltage) may be applied to the drive lines 422 such that bringing a conductive object 404 near one or more of the capacitive sensor changes the projected electric field in a localized manner that reduces mutual capacitance. For example, the capacitance change at individual points on a grid may be measured to determine a touch location (e.g., or touch locations) by measuring voltage (e.g., collected charge).

A mutual capacitance method may include providing drive electrodes and receive electrodes organized as a matrix (e.g., an array) and measuring capacitive coupling at points in the matrix, which, in turn, in the presence of a touch or touches, may act to locate the touch or touches with respect to the matrix.

In the example of FIG. 4, the touch controller circuitry 450 includes a signal source 452 operatively coupled to the drive lines 422, a multiplexer 454 operatively coupled to the sense lines 424 and an analog-to-digital converter (ADC) 456, for example, to convert sensed analog signals of the sense lines 424 received via the multiplexer 454 to digital signals. As shown in the example of FIG. 4, the digital signal processor (DSP) 462 may receive digital signals from the touch controller circuitry 450 and provide output based at least in part on digital signal processing to the host 470. As an example, the DSP 462 may receive an output array from the touch controller circuitry 450 where values in the array represent capacitance at, for example, x-y intersections of a mutual capacitance grid of the touchscreen 410. As an example, the DSP 462 may be included in the touch controller circuitry 450.

Figure 5:
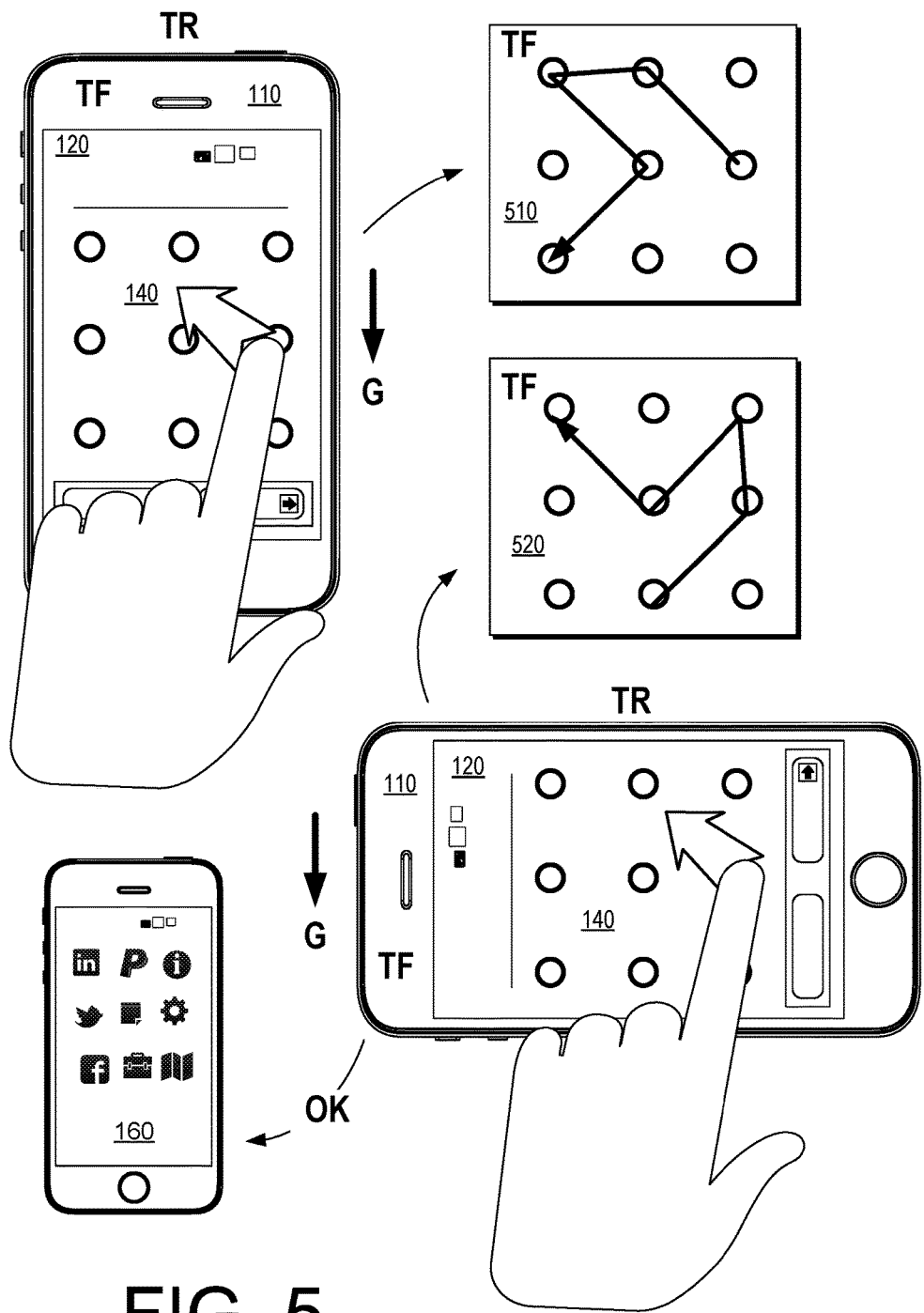
FIG. 5 is a diagram of an example of a device.

FIG. 5 shows an example of a security mechanism that includes an orientation feature such that "wear" patterns 510 and 520 associated with a swipe pattern can differ. As shown in FIG. 5, where a security mechanism verifies information, the device 110 can transition from a locked state to an unlocked state, for example, to render icons 160 (e.g., a "desktop" that includes icons 160).

As shown in FIG. 5, the device 110 can include a top fixed (TF) and a top relative (TR) that is relative to a direction of the acceleration of Earth's gravity (e.g., as an example of a geo-reference). Where TF is the same as TR, the wear pattern 510 results; whereas, where TF and TR differ, as shown in the lower right of FIG. 5, the wear pattern 520 results. In such an example, the "code" (e.g., the swipe pattern) can remain the same yet the wear pattern can differ. The difference in the wear patterns can act to obscure both wear patterns. While the example of FIG. 5 shows two orientations, two additional orientations may be implemented where TR is not aligned with TF.

As an example, TF (top fixed) can be considered to be a feature of the device, which may be an immutable feature of the device. As an example, a device can include a top that is fixed, a bottom that is fixed, a right side that is fixed with respect to the top being oriented upwards toward the sky and the bottom being oriented downwards toward the Earth and a left side that is fixed with respect to the top being oriented upwards toward the sky and the bottom being oriented downwards toward the Earth. One or more of such fixed features may be a reference as to an orientation of such a device. As an example, where a device is oriented in an orientation other than the top being oriented upwards toward the sky and the bottom being oriented downwards toward the Earth, one or more relative indicators may be utilized (e.g., top relative, bottom relative, right side relative, left side relative).

As an example, where a device is horizontal (e.g., where the acceleration of gravity forms a normal to a plane defined by a touchscreen of the device), information sensed by the device can be used to determine which side of the device may be oriented toward a user or away from a user. For example, information sensed during movement of the device from one orientation to another orientation (e.g., horizontal) may be utilized to determine an orientation of the device.

As an example, a reference can be a physical reference associated with the planet Earth (e.g., a "geo-reference"). The gravity of Earth, which is denoted by G (e.g., or "g"), refers to the acceleration that the Earth imparts to objects on or near its surface due to gravity. As an example, a geo-reference can be associated with the Earth's magnetic field, also known as the geomagnetic field. While the Earth's magnetic field changes over time because it is generated by a geodynamo, the North and South magnetic poles wander widely, but sufficiently slowly for purposes of use as a geo-reference or geo-references. As an example, a magnetometer may provide information as to a geo-reference (e.g., Earth's magnetic field). As an example, an accelerometer and/or a gyroscope may provide information as to a geo-reference (e.g., Earth's gravity field).

In the example of FIG. 5, the device 110 can include an orientation sensor that can output orientation information for a security mechanism. Such a security mechanism can receive the orientation information and utilize it in combination with touch information as to a swipe pattern. In such a manner, the security mechanism can determine whether a proper swipe pattern has been received (e.g., sensed by a touchscreen).

In the example of FIG. 5, a user may choose an orientation. For example, a user can continuously change orientation of the device 110 and enter the swipe pattern using gravity as a reference. For example, the user can hold the device 110 upside down (e.g., TR opposite to TF) and enter her swipe pattern the same way she would as if she was holding the device normally (e.g., TR aligned with TF). As shown, in FIG. 5, the user can hold the device 110 horizontally, which may be in either one of two horizontal positions.

As an example, a method can include taking an end/side toward the Earth as "down" and an opposing end/side toward the sky as "up". In such an example, the side closer to the user's left shoulder may be processed as "left" and the opposite of that processed as "right." As explained, such a method can include obscuring the swipe pattern on a surface associated with a touchscreen display.

Figure 6:
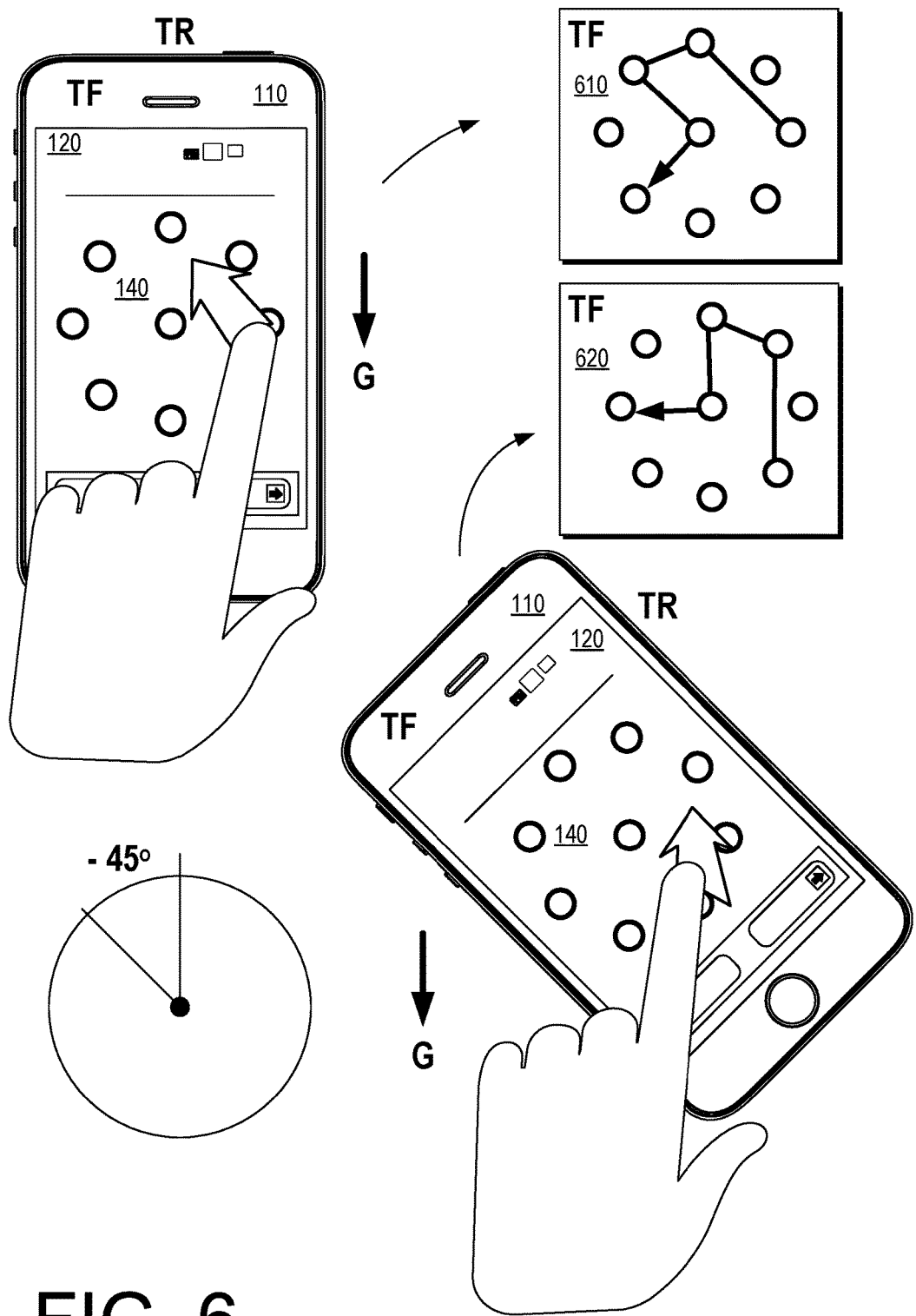
FIG. 6 is a diagram of an example of a device.

FIG. 6 shows an example of a security mechanism that includes an orientation feature such that "wear" patterns 610 and 620 associated with a swipe pattern can differ.

As shown in FIG. 6, the device 110 can include a top fixed (TF) and a top relative (TR) that is relative to a top angle. Where TF is the same as TR, the wear pattern 610 results; whereas, where TF and TR differ, as shown in the lower right of FIG. 6, the wear pattern 620 results. In such an example, the "code" (e.g., the swipe pattern) can remain the same yet the wear pattern can differ. The difference in the wear patterns can act to obscure both wear patterns. While the example of FIG. 6 shows two orientations, additional orientations may be implemented where TR is not aligned with TF.

In the example of FIG. 6, the device 110 can include an orientation sensor that can output orientation information for a security mechanism. Such a security mechanism can receive the orientation information and utilize it in combination with touch information as to a swipe pattern. In such a manner, the security mechanism can determine whether a proper swipe pattern has been received (e.g., sensed by a touchscreen).

In the example of FIG. 6, a user may choose an orientation. For example, a user can continuously change orientation of the device 110 and enter the swipe pattern using a top angle as a reference (e.g., 0 degrees, when aligned along a long axis of the device 110 from feet to head, floor to ceiling, ground to sky, etc.). For example, the user can hold the device 110 upside down (e.g., TR opposite to TF) via rotation of about 180 degrees and enter her swipe pattern the same way she would as if she was holding the device normally (e.g., TR aligned with TF) at about 0 degrees. As shown, in FIG. 6, the user can hold the device 110 at about −45 degrees with respect to the zero degree reference angle.

In the example of FIG. 6, the increments in number of degrees may be determined, for example, at least in part via a pattern of dots, a number of dots, etc. For example, as shown, for nine dots, with a central dot, eight of the dots are disposed at increments of 360/8 degrees, which is about 45 degrees. Thus, there may be 8 possible orientations (e.g., eight relative top positions) in the example of FIG. 6 (e.g., consider an octahedron type of connected dot pattern or other type of polygonal connected dot pattern, which may or may not include one or more interior and/or one or more exterior dots).

Figure 7:
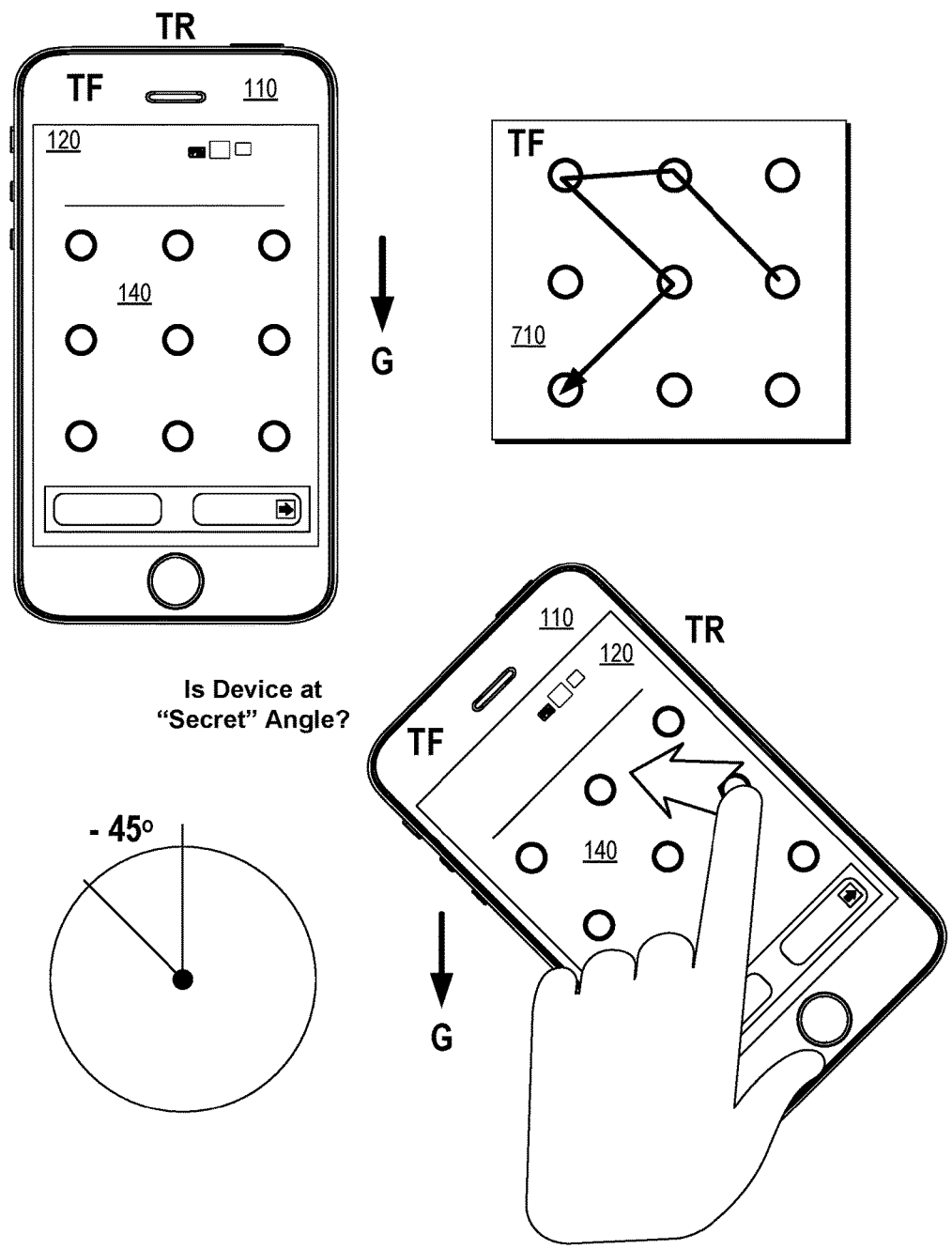
FIG. 7 is a diagram of an example of a device.

FIG. 7 shows an example of a security mechanism that includes an orientation feature. For example, the orientation feature can correspond to a secret angle. In such an example, a security mechanism may determine whether a swipe pattern was entered while the device was orientated at the "secret" angle (e.g., an angle that may be stored in memory of the device 110). As an example, a value for an angle may be stored in memory of a device, values that can represent an angle (e.g., two vectors, etc.), etc.

As an example, two angles may be utilized, for example, consider a planar touchscreen display of a device that may be oriented substantially with respect to gravity and may be tilted about 45 degrees clockwise where the planar touchscreen display is facing a user. In such an example, a tilt away from gravity of more than about a few degrees such that a vector normal to the planar touchscreen display has a component aligned with or against the direction of gravity may cause the device to prohibit unlocking (e.g., acceptance of a swipe pattern, etc.) even where the about 45 degree clockwise tilt condition is met. In various examples, where an angle or angle conditions are implemented, an acceptance margin or margins may exist about the angle or the angles (e.g., consider margins of plus or minus about 5 degrees).

As an example, a user may be instructed to consider angles that are referenced with respect to a clock (e.g., 1 o'clock, 2 o'clock, etc.). In such an example, a device may offer an option as to whether to refine angle options to, for example, 0:30, 1:00 1:30, 2:00, 2:30, etc. (e.g., depending on a user's desire for security, ability to reproduce an angle, etc.).

As an example, in the scenario of FIG. 7, the device 110 may implement an orientation lock as to the dots 140 (e.g., targets) being rendered to the touchscreen display 120. In such an example, the dots may retain a pattern even when the device 110 is oriented horizontally or upside down. In other words, such an orientation lock may prohibit auto-orientation via an automatic orientation algorithm that aims to maintain a rendered graphic, image, etc., in a top to bottom manner (e.g., consider a portrait of a person as a rendered image where the algorithm aims to maintain the person's face in a head to toe direction).

As shown in the example of FIG. 7, a user can hold the device in a particular angular orientation (e.g., about minus 45 degrees, about 45 degrees counter-clockwise or about 10:30) before entering the swipe pattern (see, e.g., a swipe pattern 710). In such an example, while the pattern may not be obscured for that use of that particular angular orientation, an intruder would have to know about the existence of that orientation factor or feature. Such an approach adds another factor to the authentication: the orientation of the device itself.

Figure 8:
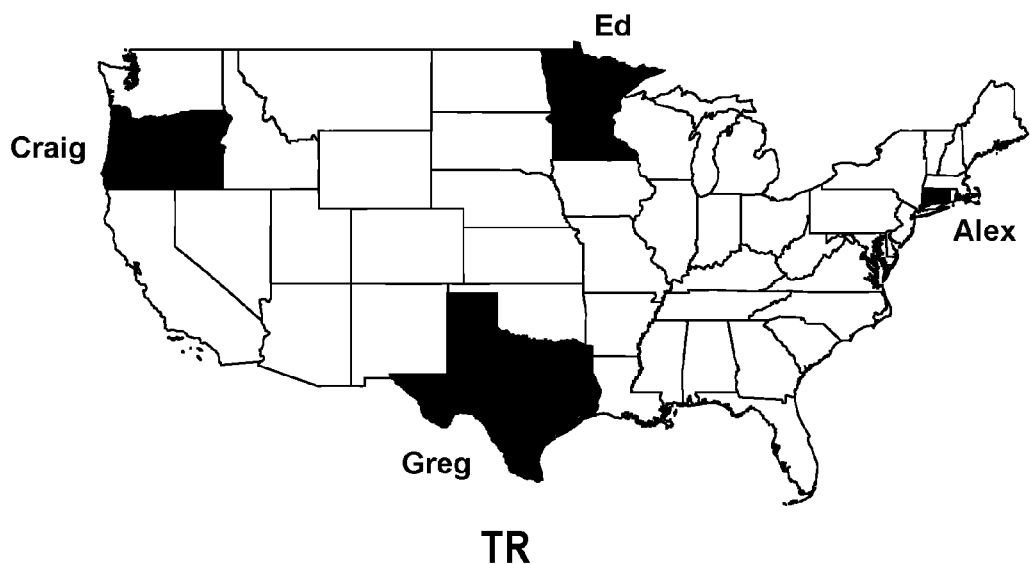
FIG. 8 is a diagram of an example of a device and an example of secret information.
Figure 8:
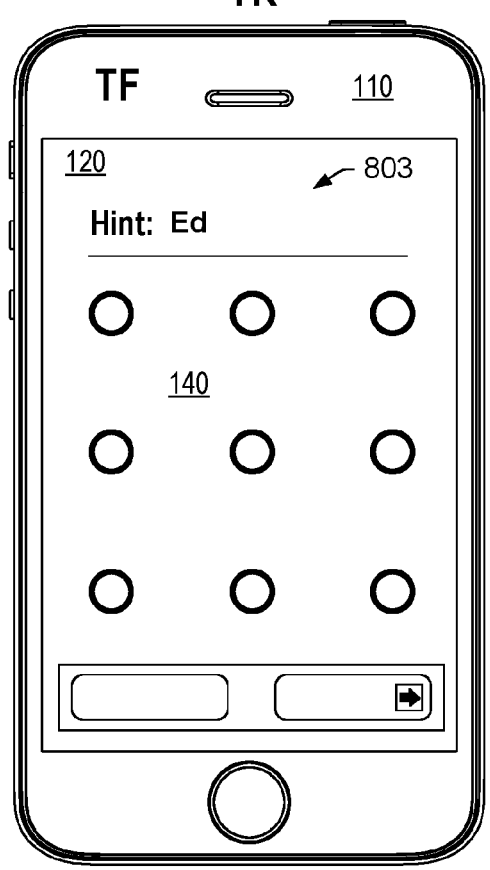

FIG. 8 shows an example of a security mechanism that includes an orientation feature. For example, the orientation feature can correspond to an orientation that may be automatically selected by the device 110 (e.g., randomly, etc.) where the device 110 outputs a hint that corresponds to secret information. For example, consider secret information 801 as to names and directions such as East, West, North and South that correspond to orientations of the device 110 such as upright (North), upside-down (South), clockwise (East) and counter-clockwise (West). As an example, the device 110 can include a set-up module that executes to guide a user to input such secret information (e.g., as word association with orientations). Where the device 110 is in a locked state and a user desires transitioning the device 110 to an unlocked state, the user may touch the device 110 such that a hint is provided, for example, in a hint field 803 on the touchscreen display 120. As an example, a hint may be an audio hint, for example, a sound rendered via a speaker of the device 110. As an example, a hint may be a tactile hint, for example, generated via a vibrator and/or generated via a tactile display (e.g., that can render bumps, etc.).

As shown in the example of FIG. 8, the secret information 801 includes four different words (e.g., names) associated with four different orientations. The hint field 803 can render one of the words to the touchscreen display 120 and, in turn, a user can orient the device 110 to a particular orientation. Once at that orientation, the user may touch the surface associated with the touchscreen display 120 and enter a swipe pattern. In such an example, a security mechanism may determine whether the swipe pattern was entered while the device was orientated at the "secret" orientation (e.g., an orientation determined by the device 110). As an example, the swipe pattern entered may be according to a relative top, for example, as in the example of FIG. 5. In such an example, the swipe pattern may be obscured where the device 110 uses more than one secret orientation. While names are illustrated, other type of orientation information may be used (e.g., city, global, stars, etc.).

As an example, on each attempt, a device can provide a hint as to what orientation is needed in order to accept a swipe pattern. In such an example, hints can force a random orientation so that no lasting imprint is left on the surface. Here, a perpetrator would have to know about the orientation factor and would have to know about the hints. As an example, hints may be of a nature that does not give away the orientation requirement. For example, hints may be those with a high likelihood that only an authorized user would understand. As mentioned, such an approach may be implemented to provide for obscuring the swipe pattern on the surface and in adding another factor to the authentication, both increasing the level of security.

Figure 9:
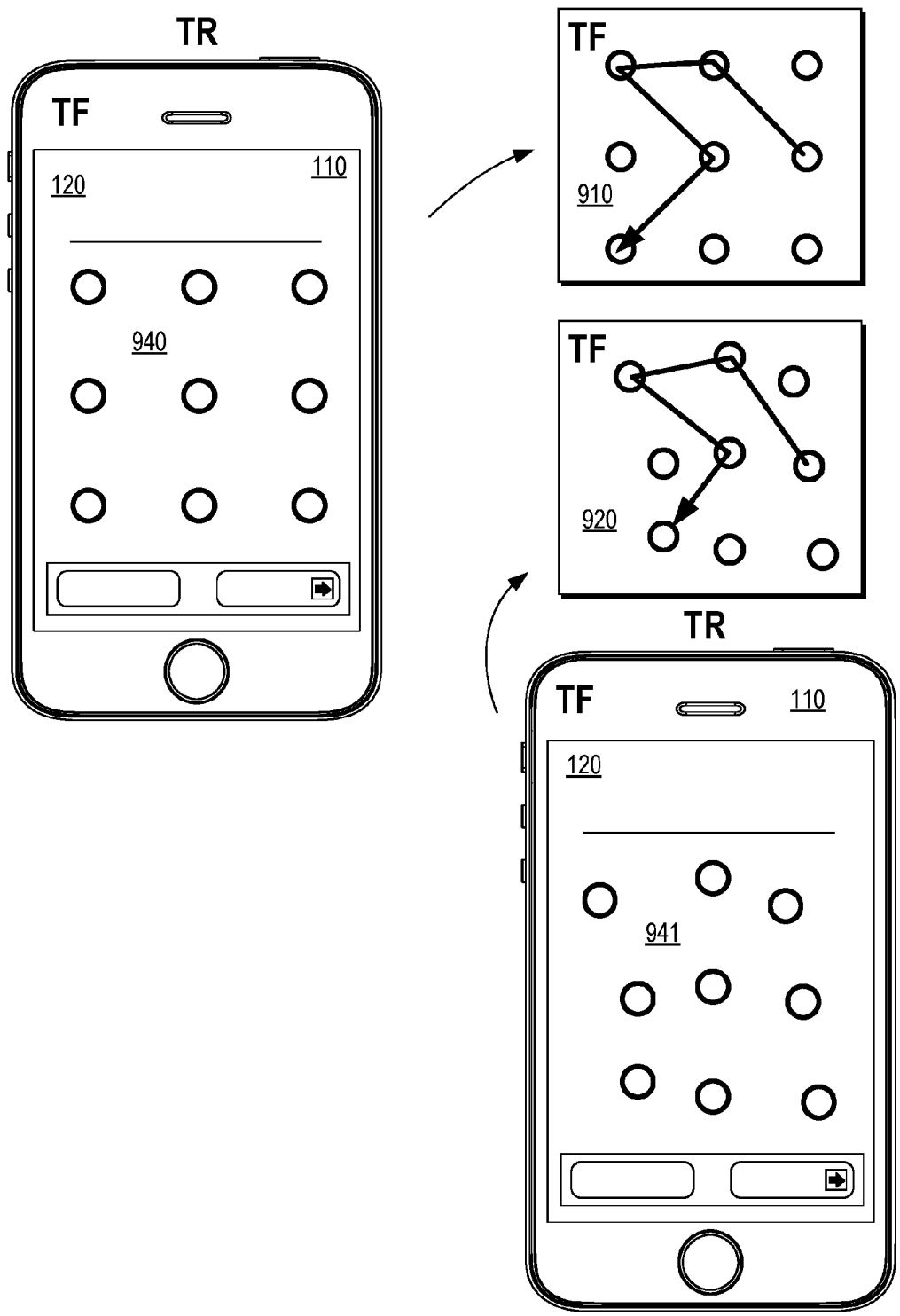
FIG. 9 is a diagram of an example of a device.

FIG. 9 shows an example of a security mechanism that includes an orientation feature such that "wear" patterns 910 and 920 associated with a swipe pattern can differ.

In the example of FIG. 9, the device 110 can alter the arrangement of the dots 140 (e.g., targets) as rendered to the touchscreen display 120. For example, the device 110 may consider rendering a regular matrix of dots and one or more other arrangements of the dots where the "matrix" nature may still be discernable to a user. For example, in FIG. 9, a regular array of the dots 940 may be rendered to the touchscreen display 120 and a distorted version of the dots 941 may be rendered to the touchscreen display 120.

As shown in FIG. 9, the device 110 can include a top fixed (TF) and a top relative (TR) that is relative to a direction of a geo-reference. As to wear patterns associated with a geo-reference, some examples are shown in FIG. 5. As an example, the approach of FIG. 5 may include a distortion approach as in FIG. 9 (e.g., a re-arrangement approach).

As an example, dots may be target points. As an example, target points may include rendered graphics with the same shape and/or with different shapes. As an example, a method can include geometrically rearranging target points. As an example, such rearranging can include distorting a matrix. For example, consider moving points inward, outward, skewing, etc. As an example, a "rectangular" grid (e.g., defined by 90 degree internal angles at corners of a perimeter) may become a parallelogram, a trapezoid, etc., where one or more internal angles differ from approximately 90 degrees. Where a method utilizes a plurality of different arrangements of target points, such a method can act to obscure a swipe pattern.

As an example, an option to rearrange target points may be implemented on a device, for example, in combination with one or more other techniques that aim to enhance security (e.g., enhance a security mechanism). obscures the swipe pattern and adds another factor of authentication.

Figure 10:
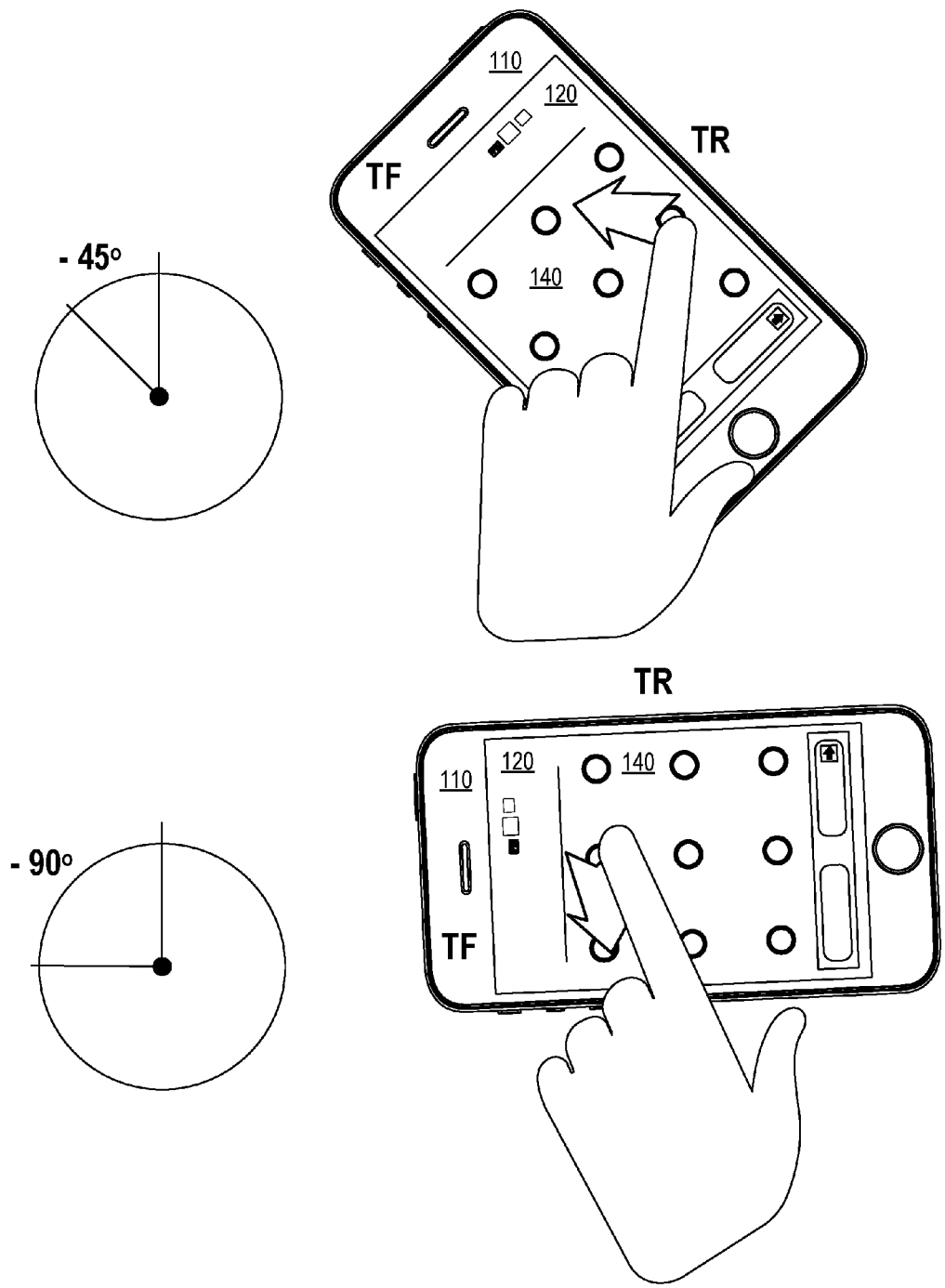
FIG. 10 is a diagram of an example of a device.

FIG. 10 shows an example of a security mechanism that includes an orientation feature. In the example of FIG. 10, the device 110 can include angle orientation information associated with a swipe pattern where, for example, at least two different portions of the swipe pattern are to be entered with the device 110 at two different orientations (e.g., angles of approximately −45 degrees and approximately −90 degrees). In such an example, the device 110 may allow for a range of degrees about a target degree, for example, approximately 90 degrees may be a range of about −85 to about −95 degrees. As shown in FIG. 10, a user may enter a portion the swipe pattern in one orientation, change the orientation, then continue with another portion (e.g., or the remainder) of the swipe pattern in the changed orientation.

Figure 11:
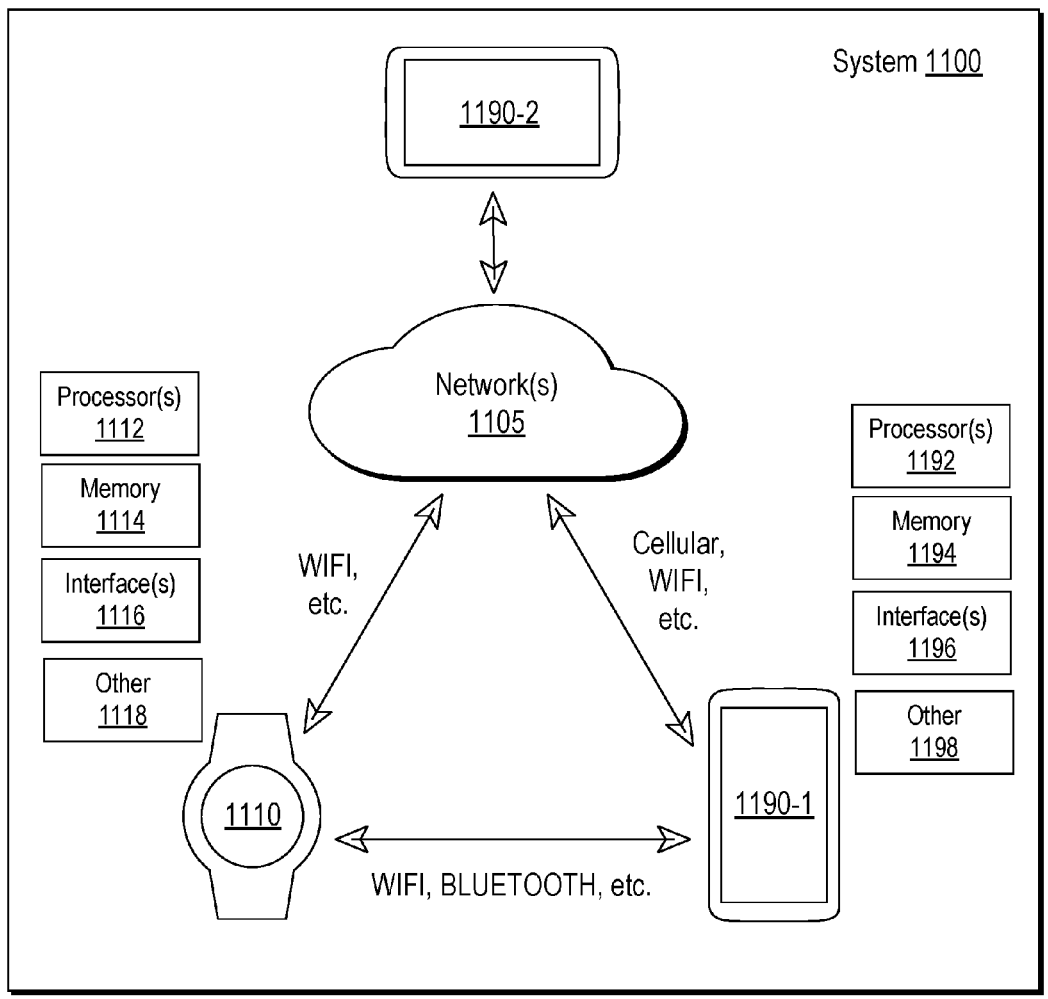
FIG. 11 is a diagram of an example of devices in a system.

FIG. 11 shows an example of a system 1100 that includes one or more networks 1105, a wearable device 1110 (e.g., a watch, etc.) and one or more other devices 1190-1 and 1190-2. As shown, the wearable device 1110 can include one or more processors 1112, memory 1114, one or more interfaces 1116 and one or more other components 1118. As shown, the device phone 1190-1 can include one or more processors 1192, memory 1194, one or more interfaces 1196 and one or more other components 1198. As an example, a device can include a processor and memory operatively coupled to the processor. In such an example, the memory can store instructions executable by the processor to instruct the device to perform one or more actions. As an example, an interface may be a wireless communication interface (e.g., for transmission and/or reception of information).

Figure 12:
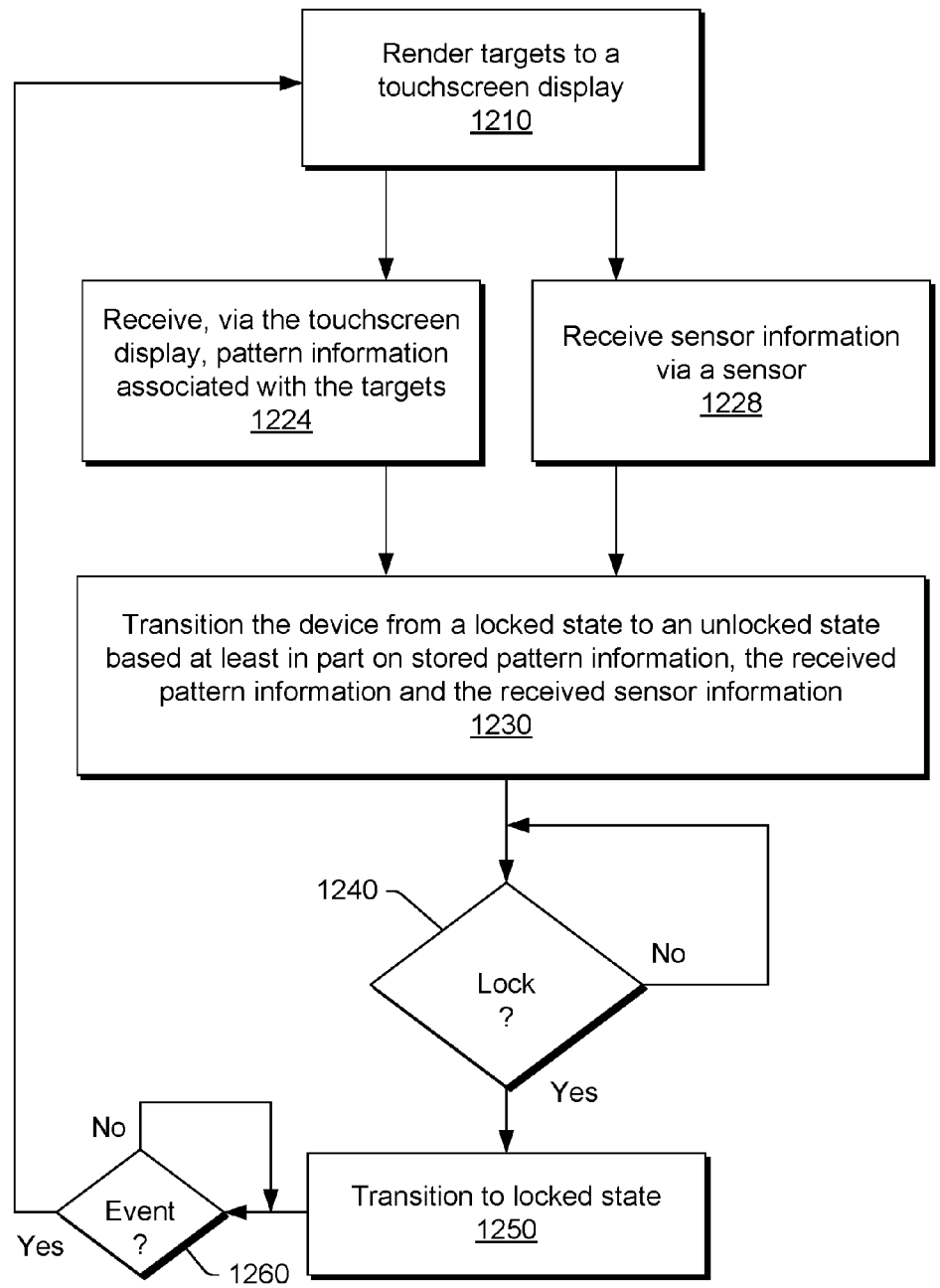
FIG. 12 is a diagram of an example of a method.

FIG. 12 shows an example of a method 1200 that includes a render block 1210 for rendering targets to a touchscreen display of a device; a reception block 1224 for receiving, via the touchscreen display, pattern information associated with the targets; a reception block 1228 for receiving sensor information via a sensor; and a transition block 1230 for transitioning the device from a locked state to an unlocked state based at least in part on stored pattern information, the received pattern information and the received sensor information.

As shown in the example of FIG. 12, the method 1200 can include a decision block 1240 for deciding whether to transition the device to a locked state, for example, responsive to input, a timer, etc. Where the decision block 1240 decides to transition the device to the locked state, the method 1200 can proceed to a transition block 1250 for transitioning the device to the locked state. As an example, a decision block 1260 can decide whether an event has occurred that triggers a return to the render block 1210 (e.g., or optionally an intermediate block).

As an example, upon detection of an event, the decision block 1260 may cause the device to implement logic associated with a security mechanism that receives information and determines whether to transition the device to an unlocked state based at least in part on a portion of the received information.

As an example, a device may be a portable device or may be an orientable device. For example, a device may be fixed to a structure yet mounted in a manner where it can be oriented. As an example, such a device may implement a swipe pattern security mechanism. In such an example, the device may be utilized by a particular individual with a particular swipe pattern that is kept as a secret by that person or, on an as needed and/or trusted basis, shared with one or more other individuals. As an example, a device may be mounted in a vehicle and be orientable. For example, a control panel can include a touchscreen display that may be maneuvered by a user. In such an example, the control panel may implement one or more security mechanism techniques described herein.

As an example, a device may be or include a fingerprint reader. As an example, where touch evidence exists, a person may be able to uncover a fingerprint pattern of a user and, for example, reproduce that fingerprint pattern or at least enough of the pattern to successfully overcome a security mechanism. As an example, a fingerprint reader may be orientable such that touch evidence can be obscured, for example, via one or more techniques described herein.

As an example, a fingerprint reader may be fixed, yet a person may be able to orient a finger with respect to a fingerprint reader (e.g., reader window). In such an example, the fingerprint reader may provide a word or words as secret words that can be understood by a person as to which direction to orient a finger with respect to the fingerprint reader. In such an example, where the fingerprint reader changes the words (e.g., randomly, etc.), the person may touch the fingerprint reader in a manner that obscures prior finger residue, for example, as an added security measure.

As an example, a device can include a processor; memory operatively coupled to the processor; a touchscreen display operatively coupled to the processor; a sensor operatively coupled to the processor; and instructions stored in the memory and executable by the processor to render targets to the touchscreen display, receive, via the touchscreen display, pattern information associated with the targets, receive sensor information via the sensor, and transition the device from a locked state to an unlocked state based at least in part on stored pattern information, the received pattern information and the received sensor information. In such an example, the sensor information can include angular orientation information.

As an example, a device can include a secret angular orientation and instructions stored in the memory and executable by a processor to transition the device to an unlocked state based at least in part on a comparison of angular orientation information and the secret angular orientation. As an example, a device can include instructions stored in memory and executable by a processor to randomly determine a secret angular orientation and to render a hint via the device associated with the secret angular orientation. In such an example, the device may render a hint as an audio signal or signals (e.g., a word, a noise, etc. via a speaker) and/or the device may render a hint as a visual signal or signals (e.g., a word, a graphic, etc. via a touchscreen display).

As an example, a secret angular orientation can be a shared secret. For example, a secret that is known to a user of a device and for which information is stored within memory of the device.

As an example, angular orientation information can be or include an angular orientation referenced with respect to a geophysical direction (e.g., gravity, magnetic pole, etc.).

As an example, targets rendered to a touchscreen display can be associated with digits where, for example, stored pattern information includes a sequence of digits. As an example, targets rendered to a touchscreen display can be associated with digits where, for example, stored pattern information includes a value based at least in part on a plurality of digits. For example, a value may be a hash value.

As an example, a device can include at least one sensor where the at least one sensor is or includes at least one of an accelerometer, a magnetometer and a gyroscope.

As an example, a device can include instructions stored in memory and executable by a processor to render targets to a touchscreen display where execution of the instructions causes the device to render the targets in a randomly selected arrangement that is an alteration of a base arrangement. For example, a base arrangement may be a matrix (e.g., a 3×3 matrix or other type of matrix). In such an example, the randomly selected arrangement may be a skewed matrix, a distorted matrix, etc., where at least some positions of the targets are altered from their corresponding positions of the base arrangement (e.g., a base matrix, etc.). For example, an individual target can include a neighborhood that may be a radius or block about which that target's position can be altered. In such an example, a device may select randomly a position within that neighborhood and use that position to render the target to a touchscreen display. As an example, a device can include randomly sampling one or more target neighborhoods for one or more corresponding target positions where rendering of targets to a touchscreen display is based at least in part on the one or more randomly sampled target positions.

As an example, sensor information can include information indicative of a relative orientation of a geometric feature of the device. As an example, a geometric feature of a device may be defined as one of a top, a bottom, a right side, and a left side. As an example, a relative orientation may be defined as a relative top, a relative bottom, a relative right or a relative left orientation. For example, a fixed bottom may be a relative top where the fixed bottom is oriented upwards toward the sky.

As an example, targets can be targets of a user interface (UI) where, for example, the orientation of the UI on a touchscreen display of a device is fixed in a locked state of a device (e.g., lockout enabled). In such an example, pattern information can be received via the touchscreen of the device independent of orientation of the device. Where such a device transitions to an unlocked state, information rendered to the touchscreen (e.g., a UI, etc.) may re-orient depending on orientation of the device (e.g., lockout disabled); noting that z-lockout circuitry may control at least in part whether or not re-orienting occurs.

As an example, pattern information can include a first portion and a second portion. In such an example, sensor information can include a first angular orientation associated with the first portion of the pattern information and a second angular orientation associated with the second portion pattern information (see, e.g., the example of FIG. 10).

As an example, a method can include rendering targets to a touchscreen display of a device; receiving, via the touchscreen display, pattern information associated with the targets; receiving sensor information via a sensor of the device; and transitioning the device from a locked state to an unlocked state based at least in part on stored pattern information, the received pattern information and the received sensor information. In such an example, the pattern information can include a sequence (e.g., a swipe pattern sequence where individual targets are touched in succession within a period of time, which may be a swipe pattern time entry window). As an example, stored pattern information can be or include a value (e.g., a hash value based at least in part on a series of digits, etc.).

As an example, a method can include transitioning a device to an unlocked state based at least in part on determining an orientation of the device based at least in part on sensor information. In such an example, transitioning the device from a locked state to an unlocked state can be based at least in part on stored orientation information.

As an example, a method can include transitioning a device from an unlocked state to a locked state, waiting for a trigger event and repeating rendering of targets to a touchscreen display of the device. In such an example, the repeating the rendering of targets can optionally include altering an arrangement of at least a portion of the targets.

As an example, sensor information can include a secret angular orientation (e.g., a secret angle) and a method can include transitioning a device from a locked state to an unlocked state based at least in part on the secret angular orientation. In such an example, the method can include randomly determining the secret angular orientation and rendering a hint associated with the secret angular orientation via the device (e.g., audibly rendering, visually rendering, tactilely rendering, etc.). As an example, a secret angular orientation can be a shared secret.

As an example, a method can include receiving sensor information that includes information indicative of a relative orientation of a geometric feature of the device.

As an example, targets can be targets of a UI rendered to a touchscreen display of a device and a method can include fixing the orientation of the UI on the touchscreen display in a locked state of the device where, for example, receiving pattern information via the touchscreen receives the pattern information independent of orientation of the device.

As an example, a method can include receiving, via a touchscreen display of a device, pattern information associated with targets rendered to the touchscreen display of the device and receiving sensor information via a sensor of the device where the sensor information includes sensor information for a first orientation angle that is associated with receipt of a first portion of the pattern information and receiving sensor information for a second orientation angle that is associated with receipt of a second portion of the pattern information (see, e.g., the example of FIG. 10).

As an example, one or more computer-readable storage media can include processor-executable instructions where the instructions include instructions executable to instruct a device to render targets to a touchscreen display of the device, receive, via the touchscreen display, pattern information associated with the targets, receive sensor information via a sensor of the device, and transition the device from a locked state to an unlocked state based at least in part on stored pattern information, the received pattern information and the received sensor information.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. A computer-readable medium may be a storage device (e.g., a memory card, a storage disk, etc.) and referred to as a computer-readable storage medium.

As described herein, various acts, steps, etc., may be implemented as instructions stored in one or more computer-readable storage media where a computer-readable storage medium is not a signal. For example, one or more computer-readable storage media can include computer-executable instructions (e.g., instructions executable by a computer, processor-executable, instructions executable by a processor) to instruct a device. A computer-readable medium may be a computer-readable storage medium that is not a carrier wave.

Figure 13:
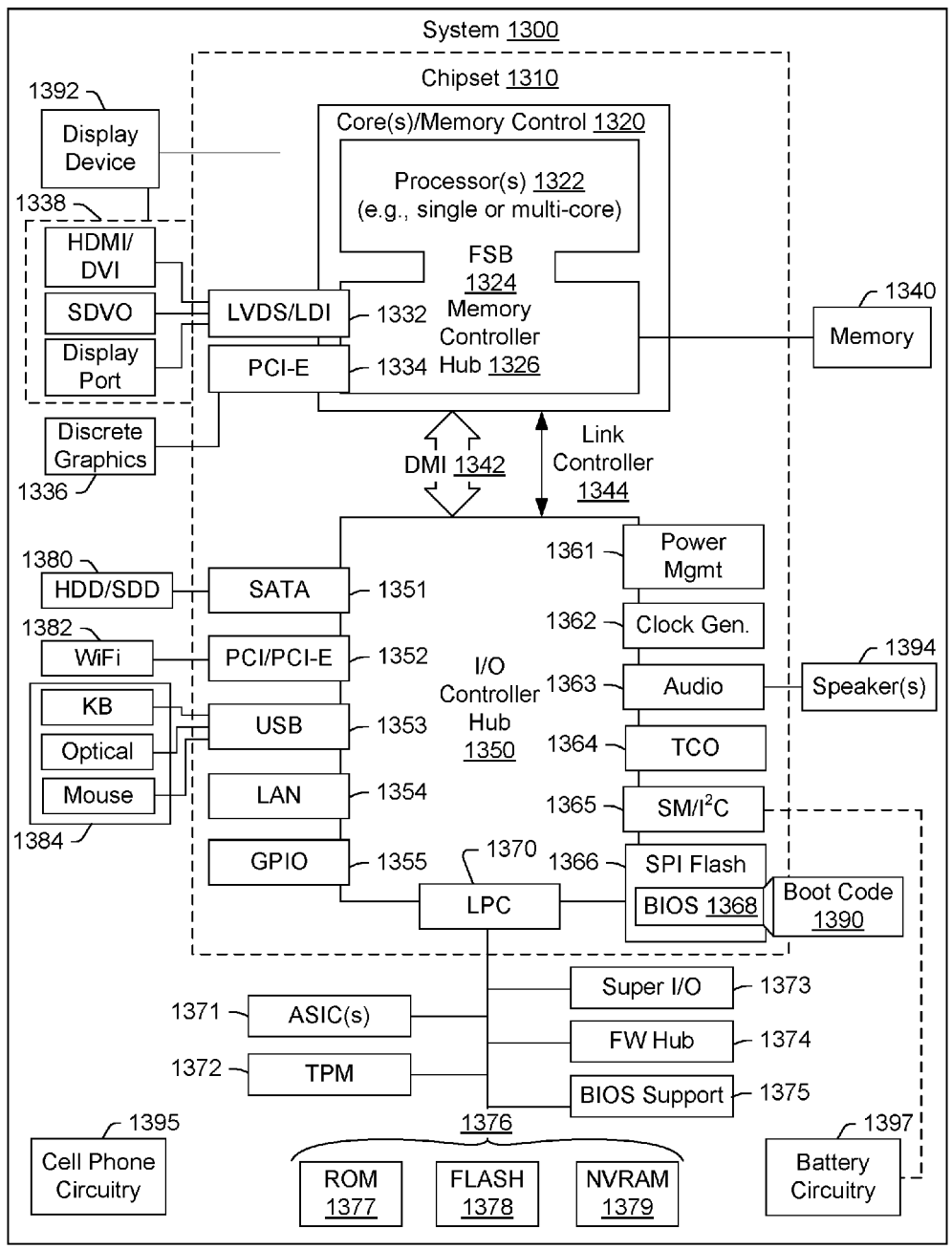
FIG. 13 is a diagram of an example of a system that includes one or more processors.

While various examples of circuits or circuitry have been discussed, FIG. 13 depicts a block diagram of an illustrative computer system 1300. The system 1300 may be a computer system, such as one of the ThinkCentre® or ThinkPad® series of personal computers sold by Lenovo (US) Inc. of Morrisville, N.C.; however, as apparent from the description herein, a phone, a tablet, a base, a server or other machine may include other features or only some of the features of the system 1300. As an example, a device such as, for example, the device 110 may include at least some of the features of the system 1300.

As shown in FIG. 13, the system 1300 includes a so-called chipset 1310. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 13, the chipset 1310 has a particular architecture, which may vary to some extent depending on brand or manufacturer. The architecture of the chipset 1310 includes a core and memory control group 1320 and an I/O controller hub 1350 that exchange information (e.g., data, signals, commands, etc.) via, for example, a direct management interface or direct media interface (DMI) 1342 or a link controller 1344. In the example of FIG. 13, the DMI 1342 is a chip-to-chip interface (sometimes referred to as being a link between a "northbridge" and a "southbridge").

The core and memory control group 1320 include one or more processors 1322 (e.g., single core or multi-core) and a memory controller hub 1326 that exchange information via a front side bus (FSB) 1324. As described herein, various components of the core and memory control group 1320 may be integrated onto a single processor die, for example, to make a chip that supplants the conventional "northbridge" style architecture.

The memory controller hub 1326 interfaces with memory 1340. For example, the memory controller hub 1326 may provide support for DDR SDRAM memory (e.g., DDR, DDR2, DDR3, etc.). In general, the memory 1340 is a type of random-access memory (RAM). It is often referred to as "system memory".

The memory controller hub 1326 further includes a low-voltage differential signaling interface (LVDS) 1332. The LVDS 1332 may be a so-called LVDS Display Interface (LDI) for support of a display device 1392 (e.g., a CRT, a flat panel, a projector, etc.). A block 1338 includes some examples of technologies that may be supported via the LVDS interface 1332 (e.g., serial digital video, HDMI/DVI, display port). The memory controller hub 1326 also includes one or more PCI-express interfaces (PCI-E) 1334, for example, for support of discrete graphics 1336. Discrete graphics using a PCI-E interface has become an alternative approach to an accelerated graphics port (AGP). For example, the memory controller hub 1326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As to some examples, a sensor display may rely on resistive sensing, optical sensing, or other type of sensing. As an example, a device can include digitizer circuitry that interacts with a stylus, which may be, for example, an active stylus, a passive stylus or an active and passive stylus.

The I/O hub controller 1350 includes a variety of interfaces. The example of FIG. 13 includes a SATA interface 1351, one or more PCI-E interfaces 1352 (optionally one or more legacy PCI interfaces), one or more USB interfaces 1353, a LAN interface 1354 (more generally a network interface), a general purpose I/O interface (GPIO) 1355, a low-pin count (LPC) interface 1370, a power management interface 1361, a clock generator interface 1362, an audio interface 1363 (e.g., for speakers 1394), a total cost of operation (TCO) interface 1364, a system management bus interface (e.g., a multi-master serial computer bus interface) 1365, and a serial peripheral flash memory/controller interface (SPI Flash) 1366, which, in the example of FIG. 13, includes BIOS 1368 and boot code 1390. With respect to network connections, the I/O hub controller 1350 may include integrated gigabit Ethernet controller lines multiplexed with a PCI-E interface port. Other network features may operate independent of a PCI-E interface.

The interfaces of the I/O hub controller 1350 provide for communication with various devices, networks, etc. For example, the SATA interface 1351 provides for reading, writing or reading and writing information on one or more drives 1380 such as HDDs, SDDs or a combination thereof. The I/O hub controller 1350 may also include an advanced host controller interface (AHCI) to support one or more drives 1380. The PCI-E interface 1352 allows for wireless connections 1382 to devices, networks, etc. The USB interface 1353 provides for input devices 1384 such as keyboards (KB), one or more optical sensors, mice and various other devices (e.g., microphones, cameras, phones, storage, media players, etc.). As mentioned, a USB interface may provide for charging and/or data transfer. One or more other types of sensors may optionally rely on the USB interface 1353 or another interface (e.g., $I^2C$, etc.). As to microphones, the system 1300 of FIG. 13 may include hardware (e.g., audio card) appropriately configured for receipt of sound (e.g., user voice, ambient sound, etc.).

In the example of FIG. 13, the LPC interface 1370 provides for use of one or more ASICs 1371, a trusted platform module (TPM) 1372, a super I/O 1373, a firmware hub 1374, BIOS support 1375 as well as various types of memory 1376 such as ROM 1377, Flash 1378, and non-volatile RAM (NVRAM) 1379. With respect to the TPM 1372, this module may be in the form of a chip that can be used to authenticate software and hardware devices. For example, a TPM may be capable of performing platform authentication and may be used to verify that a system seeking access is the expected system.

The system 1300, upon power on, may be configured to execute boot code 1390 for the BIOS 1368, as stored within the SPI Flash 1366, and thereafter processes data under the control of one or more operating systems and application software (e.g., stored in system memory 1340). An operating system may be stored in any of a variety of locations and accessed, for example, according to instructions of the BIOS 1368. Again, as described herein, a satellite, a base, a server or other machine may include fewer or more features than shown in the system 1300 of FIG. 13. Further, the system 1300 of FIG. 13 is shown as optionally include cell phone circuitry 1395, which may include GSM, CDMA, etc., types of circuitry configured for coordinated operation with one or more of the other features of the system 1300. Also shown in FIG. 13 is battery circuitry 1397, which may provide one or more battery, power, etc., associated features (e.g., optionally to instruct one or more other components of the system 1300), as well as detection circuitry (e.g., to detect a type of charging equipment, etc.). As mentioned, a SMBus may be operable via a LPC (see, e.g., the LPC interface 1370), via an I2C interface (see, e.g., the SM/I2C interface 1365), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
memory operatively coupled to the processor;
a fixed feature that defines a reference orientation of the device;
a touchscreen display operatively coupled to the processor;
a sensor operatively coupled to the processor; and
instructions stored in the memory and executable by the processor to
render targets to the touchscreen display with respect to the reference orientation of the device,
select a geophysical direction as a first shared secret from a group of different geophysical directions wherein each of the different geophysical directions comprises a corresponding hint,
render the hint for the geophysical direction,
receive, via the touchscreen display, pattern information associated with the targets,
receive sensor information via the sensor,
based at least in part on the received sensor information, make a determination that a relative orientation of the device is aligned with the geophysical direction,
based at least in part on the received pattern information, make a determination that a match exists with respect to stored pattern information that is a second shared secret, and
transition the device from a locked state to an unlocked state based at least in part on the determinations as to the first and second shared secrets.

2. The device of claim 1 wherein the targets comprise associated digits and wherein the stored pattern information comprises a sequence of digits.

3. The device of claim 1 wherein the targets comprise associated digits and wherein the stored pattern information comprises a value based at least in part on a plurality of digits.

4. The device of claim 1 wherein the sensor comprises at least one of an accelerometer, a magnetometer and a gyroscope.

5. The device of claim 1 wherein the instructions stored in the memory and executable by the processor to render targets to the touchscreen display further renders the targets in a randomly selected arrangement that comprises an alteration of a base arrangement.

6. The device of claim 1 wherein the fixed feature comprises a geometric feature of the device and wherein the sensor information comprises information indicative of the relative orientation of the geometric feature of the device.

7. The device of claim 1 wherein the targets comprise targets of a UI and wherein the orientation of the UI on the touchscreen display is fixed in the locked state and wherein the received pattern information is independent of orientation.

8. The device of claim 1 wherein the touchscreen display comprises a plurality of wear patterns associated with the stored pattern information that transition the device from the locked state to the unlocked state.

9. The device of claim 8 wherein the plurality of wear patterns comprise at least two overlapping wear patterns.

10. The device of claim 8 wherein at least one of the plurality of wear patterns obscures at least one other of the plurality of wear patterns.

11. The device of claim 1 comprising a plurality of wear patterns of the touchscreen display wherein each of the plurality of wear patterns corresponds to one of a plurality of different relative orientations of the device with respect to the geophysical direction.

12. The device of claim 1 wherein the group of different geophysical directions comprise compass directions.

13. The device of claim 12 wherein the geophysical direction is one of the compass directions and wherein the sensor information indicates a compass direction.

14. The device of claim 1 comprising instructions stored in the memory and executable by the processor to receive a hint for each of the different the geophysical directions.

15. The device of claim 1 comprising instructions stored in the memory and executable by the processor to randomly select the geophysical direction from the group of different geophysical directions.

16. A method comprising:
for a device that comprises a fixed feature that defines a reference orientation of the device, rendering targets to a touchscreen display of the device with respect to the reference orientation;
selecting a geophysical direction as a first shared secret from a group of different geophysical directions wherein each of the different geophysical directions comprises a corresponding hint,
rendering the hint for the geophysical direction,
receiving, via the touchscreen display, pattern information associated with the targets;
receiving sensor information via a sensor of the device;
based at least in part on the sensor information, making a determination that a relative orientation of the device is aligned with the geophysical direction,
based at least in part on the pattern information, making a determination that a match exists with respect to stored pattern information that is a second shared secret; and
transitioning the device from a locked state to an unlocked state based at least in part on the determinations as to the first and second shared secrets.

17. The method of claim 16 wherein the pattern information comprises a sequence.

18. The method of claim 16 wherein the stored pattern information comprises a value.

19. The method of claim 16 comprising transitioning the device from the unlocked state to the locked state, waiting for a trigger event and repeating the rendering of targets to the touchscreen display of the device.

20. The method of claim 19 wherein the repeating the rendering of targets alters an arrangement of at least a portion of the targets.

21. The method of claim 16 wherein the fixed feature comprises a geometric feature of the device and wherein the sensor information comprises information indicative of the relative orientation of the geometric feature of the device.

22. The method of claim 16 wherein the targets comprise targets of a UI rendered to the touchscreen display and comprising fixing the orientation of the UI on the touchscreen display in the locked state and wherein the receiving receives the pattern information independent of orientation of the device.

23. One or more non-transitory computer-readable storage media that comprise processor-executable instructions wherein the instructions comprise instructions executable to instruct a device, that comprises a fixed feature that defines a reference orientation of the device, to
render targets to a touchscreen display of the device with respect to the reference orientation,
select a geophysical direction as a first shared secret from a group of different geophysical directions wherein each of the different geophysical directions comprises a corresponding hint,
render the hint for the geophysical direction,
receive, via the touchscreen display, pattern information associated with the targets,
receive sensor information via a sensor of the device,
based at least in part on the sensor information, make a determination that a relative orientation of the device is aligned with a geophysical direction;
based at least in part on the pattern information, making a determination that a match exists with respect to stored pattern information that is a second shared secret; and
transition the device from a locked state to an unlocked state based at least in part on the determinations as to the first and second shared secrets.

\* \* \* \* \*